Dec. 14, 1926.
L. H. NICHOLSON
1,610,580
STEERING GEAR FOR MOTOR VEHICLES
Filed Nov. 9, 1925
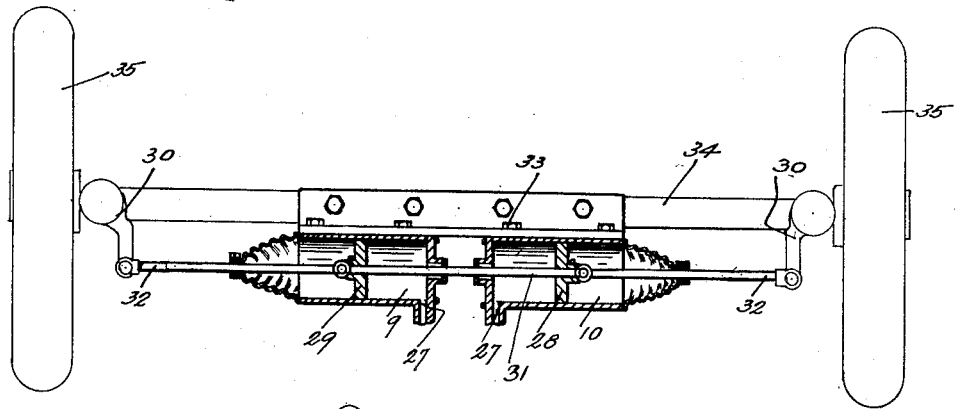
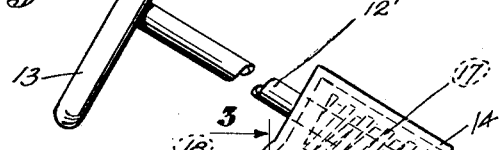
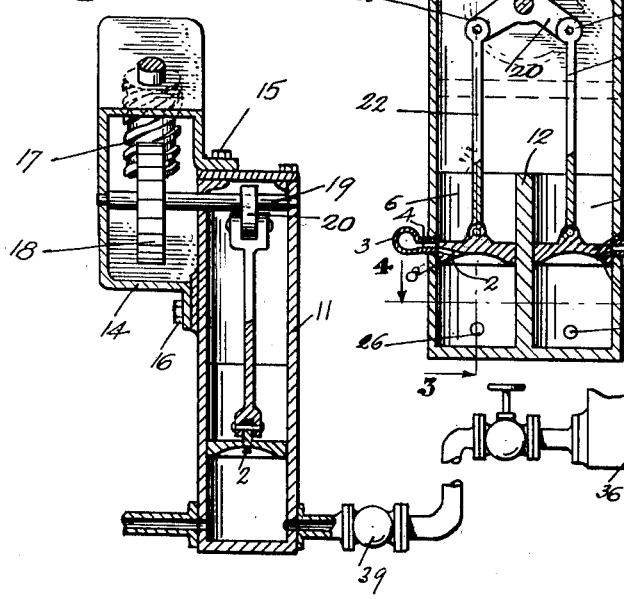
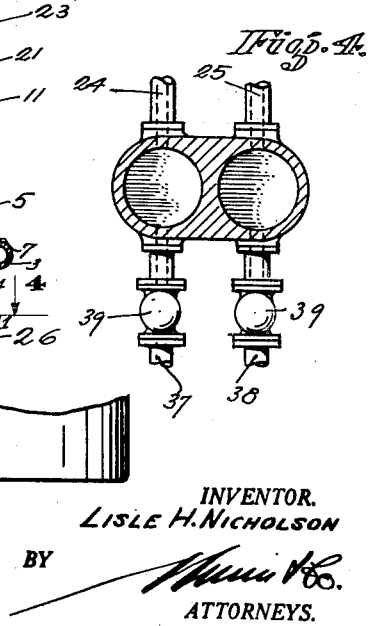
INVENTOR.
LISLE H. NICHOLSON
BY
ATTORNEYS.

Patented Dec. 14, 1926.

1,610,580

UNITED STATES PATENT OFFICE.

LISLE H. NICHOLSON, OF LONGVIEW, WASHINGTON.

STEERING GEAR FOR MOTOR VEHICLES.

Application filed November 9, 1925. Serial No. 67,935.

This invention relates to improvements in steering devices for automobiles, tractors and the like, wherein motion is transmitted from a hand wheel operated by the driver to the steering knuckles connected to the ground wheels of the vehicle.

The present invention proposes to transmit motion from the steering wheel operated by the driver to the steering knuckles of the ground wheels by a mechanism embodying the principle of a hydraulic press.

The general purpose for substituting hydraulic transmission in lieu of the usual drag link construction in the steering gear is to enable the driver to effect the turning or shifting of the ground wheels with comparative ease under varying conditions of roadbed resistance.

The above and other objects are accomplished by instrumentalities pointed out in the following specification.

The invention is clearly defined in the claims.

A satisfactory embodiment of the invention is illustrated in the accompanying drawings forming part of the specification and in which—

Figure 1 is a plan view of the steering wheels of a motor vehicle, showing a portion of my improved hydraulic transmission in horizontal section connected thereto.

Figure 2 is a view partly in vertical cross-section and side elevation of another portion of my improved hydraulic transmission connected to the hand steering wheel of a vehicle.

Figure 3 is a view in cross section taken at right angles to Figure 2 and on the line 3—3 of that figure, and Figure 4 is a detail sectional plan on the line 4—4 of Figure 2.

The transmission of the present invention comprises a pair of power cylinders 5 and 6 in which are located oppositely movable pistons 7 and 8, the movements of which control the action of fluid moving into and out of a pair of steering cylinders 9 and 10. The power cylinders 5 and 6 may, as shown, form part of a casing 11 interiorly divided by a wall 12 to provide the said cylinders 5 and 6. The casing 11 is adapted to be secured to any convenient portion of the vehicle in the vicinity of the steering column 12′ which is operated by the steering wheel 13. When secured in operative position the casing 11 extends vertically upright, and a housing 14 offset from the casing and secured to the top and one side thereof, as indicated by 15 and 16, provides a receptacle for the steering worm 17 at the lower end of the steering column 12′. The steering worm 17 meshes with a worm wheel 18, and a shaft 19 is provided for supporting the worm wheel and for being rotated thereby. The ends of the shaft in the present instance are shown as being journaled in side walls of the casing 11 and housing 14. A bell crank 20 is rigidly secured to the shaft 19 and is rocked thereby. As shown, the bell crank 20 is disposed within the upper end of the casing 11 and its arms slope downwardly and are separated for an angular distance of approximately 90° and extend over the cylinders 5 and 6 and the terminals of the arms are pivotally connected to the upper ends of the piston rods 21 and 22 as indicated by 23. The lower ends of the rods 21 and 22 are pivotally connected to the pistons 7 and 8 which by virtue of the disposition of the arms of the bell crank are moved for unequal vertical distances in opposite directions when the bell crank is rocked upon the turning of the shaft 19.

Tubular connections 24 and 25 of any approved construction, that is to say either flexible, rigid, or a combination of both, are established between the lower ends of the cylinders 5 and 6 through openings 26 in the said cylinders and openings 27 in one end of the steering cylinders 9 and 10. The purpose of these tubular connections is to convey fluid from and to the cylinders 5 and 6 and from the cylinders 9 and 10. The fluid entering the cylinders 9 and 10 acts upon the pistons 28 and 29 therein and said pistons 28 and 29 are connected to the steering knuckle arms 30.

In the construction shown in Figure 1, the pistons 28 and 29 are rigidly secured to the end portions of a tie rod 31, and are pivotally connected to the inner ends of rods 32, the outer ends of which are pivotally connected to steering knuckle arms 30. The cylinders 9 and 10 are rigidly secured as at 33 to the axle 34. It will, of course, be understood that this arrangement of parts is simply illustrative and any other arrangement may be employed which will impart lateral turning movement to the ground wheels 35. When the device is in use with a motor vehicle and the parts in normal position, the pistons 7 and 8 are disposed for approximately equal distances from the lower heads of the cylinders 5 and 6, and the pistons 28 and 29 are also spaced for approximately equal distances from the heads of the steering cylinders 9 and 10, and the intervening spaces between the pistons and the heads of the several cylinders are filled with liquid which also fills the tubular connections 24 and 25. When the hand steering wheel 13 is turned so as to depress one of the pistons, as, for instance, the piston 7, liquid is displaced from cylinder 9 by the action of piston 29 and enters cylinder 6.

When in their normal intermediate positions, the pistons 7 close air passages 4 which extend from air chambers 3 to the interiors of cylinders 5 and 6. When bell crank 20 turns and thereby imparts upward movement to one of the pistons, as for instance that indicated by 8, the opposite piston 7 is moved downwardly. When the pistons move as just stated, it is to be noted that piston 8 moves for a greater vertical distance than piston 7 and tends to establish a partial vacuum in cylinder 6, but in the upward movement of piston 8 a transverse duct 2 therein moves into alinement with the passage 4 of air chamber 3 whereupon the entrapped air moves through duct 2 and to the underside of piston 8 and partly reduces the vacuum. With this construction it is to be noted that the partial vacuum places a drag on the steering wheel when the same is manipulated to negotiate a turn and this drag tends to turn the wheel in the opposite direction so that when the turn is completed, the drag aids in imparting initial turning movement to the steering wheel in a direction to restore the same to its original position. In the downward movement of piston 8, the air entrapped between the lower concave face thereof and the adjacent surface of the liquid within the piston, is caused by the downward movement of the said piston to reenter the chamber 3 when duct 2 registers with passage 4. As to cylinder 5 and piston 7, an action corresponding to that just described takes place in the upward and downward movements of piston 7, and when the duct 1 thereof registers with passage 4.

A reservoir 36 may be employed for maintaining a supply of fluid for replenishing the transmission system whenever needed. A cylinder may be secured to any desired portion of the vehicle and provided with two valve controlled conduits 37 and 38 connected to the lower ends of the cylinders 5 and 6. Suitable check valves 39 are employed and connected to the conduits for preventing the return of fluid from the transmission system through the cylinders 5 and 6 thereof.

From the foregoing, it is to be observed that the device of this invention operates positively and expeditiously to effect the turning or shifting of the wheels 35, and the force necessary to accomplish this result is developed with comparatively little effort on the part of the operator in the turning of the steering wheel 13.

Although I have shown and described one embodiment of my invention, it is to be understood that the same is susceptible of various changes; and I reserve the right to employ such as may come within the scope of the appended claims, including the placing of the compression cylinders horizontally or in tandem if desirable.

I claim:

1. In a steering gear for vehicles, a steering column, a fluid actuator for transmitting movement from the steering column to the operating devices for the steering wheels, and comprising a pair of fluid holding cylinders, pistons arranged therein and a connection between the pistons and the steering column adapted for operating the pistons to move simultaneously in opposite directions and for unequal distances when the steering column is turned in one direction for the purpose described.

2. In a steering gear for vehicles, a steering column, a fluid actuator for transmitting movement from the steering column to the operating devices for the steering wheels and comprising a pair of fluid holding cylinders, pistons arranged within the cylinders and connections between the pistons and the steering colmun for operating the pistons to move simultaneously in opposite directions and for unequal distances when the steering column is turned in one direction, said connections including a bell crank lever and piston rods pivotally connected to the arms of the bell crank lever and to the pistons 3. In a steering gear for vehicles, a steering column, a fluid actuator for transmitting movement from the steering column to the operating devices for the steering wheels, and comprising a pair of fluid holding cylinders, pistons arranged therein and a connection between the pistons and the steering column adapted for operating the pistons to move simultaneously in opposite directions and for unequal distances when the steering column is turned in one direction, and means providing oppositely disposed air chambers connected to the cylinders and communicating with the interiors thereof, the said pistons being adapted to cut off communication between the cylinders and the air chambers when the pistons are equidistant from one end of the cylinders and further adapted to establish communication between one of the air chambers and the interior of one of the cylinders when the piston in the last named cylinder moves outwardly for the purpose described.

LISLE H. NICHOLSON.